United States Patent Office
3,832,137
Patented Aug. 27, 1974

3,832,137
GAS PHASE RADIOANALYTICAL METHOD
AND APPARATUS
Sandor Mlinko, Dezso Banfi, Emilia Dobis, Jozsef Ottinger, Karoly Payer, Tivadar Palagyi, and Agnes Turi, Budapest, Hungary, assignors to Gyogyszerkutato Intezet and Kozponti Kemiai Kutato Intezet, both of Budapest, Hungary
Filed Sept. 14, 1971, Ser. No. 180,311
Claims priority, application Hungary, Sept. 14, 1970, GO-1,147
Int. Cl. G01n 23/00, 31/12
U.S. Cl. 23—230 PC
5 Claims

ABSTRACT OF THE DISCLOSURE

Process and apparatus for the automatic, continual, gas phase determination of the radioactivity of a substance labeled with $^{14}C$ isotope involving oxidizing the substance to $^{14}CO_2$ with excess oxygen, removing the unconsumed oxygen as water after reaction with hydrogen and transporting the $^{14}CO_2$ to a detector for radioactive counting.

---

The present invention concerns the measurement in the gas phase of the radioactivity of substances labelled with $^{14}C$ isotope, preferably of organic compounds and of substances of biological origin, by means of converting the samples by combustion into a gas, preferably carbon dioxide, containing $^{14}C$ isotope, followed by the transfer of this gas sample into a detector unit, and by the determination of its radioactivity. Further, the invention concerns an apparatus for the realization of the above-described procedure.

After World War II, radioactive isotope tracer techniques became an indispensably important method of investigation in the field of natural sciences. The rapid development of the applied radiochemistry of isotopes emitting soft β-radiation in the sixties made possible the widespread use of the tracer technique based on isotopes emitting soft β-radiation also in the field of borderline areas of several disciplines. Thus, beside the field of fundamental biological and biochemical research, pharmaceutical research became in recent years the most important field of the practical application of isotopes emitting soft β-radiation. In the field of pharmaceutical research, the tracer technique based on radioactive isotopes is applied in performing routine tests in pharmacology, microbiology, toxicology and pharmaceutical technology. This novel technique of investigation contributes to a significant extent, in all the fields concerned, to the improvement of the accuracy and efficiency of research, so much that a decision accepted by the 1966 general assembly of the World Health Organization (WHO) requires the pharmacological investigation by radioactive isotopes of new pharmaceutical preparations prior to their marketing.

The behaviour of pharmaceutical preparations in living organisms, their transport processes, the mechanism of their absorption, secretion, excretion and cumulation, the metabolic alterations of the pharmaceutical preparations, moreover also their various detrimental effects on the living organism (toxicological investigations) can be established by routine tests carried out with indicator compounds labelled with radioactive isotopes. In the predominant majority of the aforementioned investigations, the radiation-emitting isotopes of organogen elements, mainly the carbon isotope of mass number 14, and, respectively, organic compounds labelled with this isotope in defined position are employed as indicator molecules for a long time impeded the application and widespread use of investigation procedures based on isotopic indicators in practical fields of various disciplines. Special methodological, isotope-analytical and nuclear measurement-technical difficulties originating from the applied radiochemistry of isotopes emitting soft β-radiation. The detection with a reliable sensitivity and accuracy of isotopes emitting soft β-radiation was and is even for the time being one of the most difficult problems in nuclear measurement techniques.

The evaluation from the aspect of isotope analysis of the special, tracer-indicated investigations in pharmaceutical research required, in addition to the mentioned difficulties, also the solution of a number of new problems in the technique of measurement. For the evaluation of a labeled sample in general the rapid and extremely sensitive measurement of activity of several thousand, frequently more than ten thousand samples of radioactive substances of a very heterogeneous nature (blood, urine, feces, 20–30 different organs, thin-layer and paper chromatograms, electropherograms, etc.) is needed. Thus, in the case of the $^{14}C$-isotope, besides the difficult detection of the β-particles of low energy, very great difficulties were encountered in the measurement of the need for the extremely high number of samples and in the unusually heterogeneous nature of samples in the field of biology.

The unusually high number of samples required makes the development of automation of the measurement methods most desirable, and the counting of extremely small amounts of radioactive substances and of the low-energy β-particles at a high efficiency suggests the development of detecting techniques of extremely high sensitivity. Solving these two problems separately represents in itself a very difficult task.

The liquid scintillation method of counting was developed at the fastest rate in the automation of the measurement of samples. The counting instruments (β-spectrometers) of fully automated operation available in the international market of instruments are capable of accepting several hundreds of samples and of measuring their radioactivity in a completely automated way, meeting almost sufficiently and with a more or less satisfactory accuracy the demands concerning the measurement of activity needed in many fields of investigations for indicating soft β-isotopes. They have, however, the common drawback that scintillation, upon which the technique is based, represents a physical phenomenon still rather unclear as regards its mechanism and its partial processes. Consequently, the sensitivity and the counting efficiency of instruments of this nature depend on the physical and chemical properties of the substances to be measured. The efficiency of counting is decreased in heterogenous systems by self-absorption and in homogeneous solutions by the extinction of colour and concentration due to the physical and chemical properties of the solvent and of the solutes (which effect even cannot be calculated previously. In other cases the count is falsely increased by phosphorescence and fluorescence caused by the aforementioned properties. The effect of these factors, which decrease and increase, respectively, the efficiency of counting, can be corrected with difficulty, their approximate calculation requires, in turn, the use of complicated and expensive auxiliary equipment such as computers.

The isotope analysis of the various biological samples of extremely heterogeneous nature obtained in the already mentioned routine tests of pharmaceutical researches can be carried out by liquid-scintillation counting techniques only with particular difficulty. Even the preparation by solubilization of counting solution is a cumbersome, labour-intensive process consisting of multiple activities which cannot be automated and which carry quite a number of error sources. Samples of biological substances are mostly coloured, and their colloidal solutions are of heterogeneous nature. On choosing the liquid scintillators, including the solvents, the solubilizers, and the applied primary and secondary scintillators, also the exterior appearance, the physical and chemical, and mainly the scintillation properties of the substances, and the various potential cases of the extinction of colours and concentrations must be taken into account, and adequate mehods for correction must be selected. Corrections require a complicated and time-consuming calculation procedure. From this it follows that at the counting by liquid scintillation, the measurement of a sample frequently requires special individual preparatory investigations, due to the broad spectrum of test substances and to their multiple nature.

Attempts were made to eliminate the above-discussed difficulties of the measurement of activity based on liquid scintillation in case of test samples containing isotopes emitting soft $\beta$-radiation, mainly $^{14}C$ isotope, by applying methods based on the counting of various particles in the gas phase. In these methods, the carbon content of the solid or liquid samples of substances is converted into gaseous form ($CO_2$, $CO$, $CH_4$). Then the gas sample is transferred into a Geiger-Mueller counter or into a counter with internal filling operated in a proportional domain or into an ionisation chamber, and its radio-activity is measured in gas phase.

Methods based on particle counting with a counting tube having internal filling offer the common advantage that an almost absolute activity without any end effect is measured by the tube, and the counting efficiency of the counter attains nearly 100%. Measurement of any type of samples is performed throughout by using the same gas (e.g. $CO_2$ or $CH_4$), evaluation is simple, no calculations are needed for corrections, the possibility of errors is low whereas reproducibility is favourable. Still, a common drawback of all the known methods of counting $^{14}C$ in the gas phase is that the preparation of samples prior to the counting of particles (i.e. the conversion of the carbon content of the sample into the gas used for counting) is a cumbersome process depending on the individual skill and training of the preparing person. The gas samples need careful purification including the freezing and isolation of carbon dioxide. Prior to the measurement of the next sample, the equipment requires always a thorough decontamination. All these operations consist of individual and discontinuous partial procedures which are extremely time- and labour-consuming.

The aim of the present invention is to develop a process and an apparatus which, by eliminating the drawbacks of the known solutions of the problem, make possible the measurement of the radioactivity of samples of substances containing $^{14}C$ isotope, at a high accuracy and high sensitivity, if desired, in a fully automated way, free of any manual intervention.

The invention is based upon the findings specified below:

(a) On converting the carbon content of samples into a gaseous carbon compound for the measurement in the gas phase, the major problem is the purification of carbon dioxide formed on combustion. Excess oxygen is needed for the quantitative combustion of the carbon content of the samples. Afterwards this excess oxygen has to be removed from the gas mixture. The technique of this removal without the intermediate isolation of carbon dioxide has not been solved up to the present. Now it has been discovered, however, that oxygen can be removed from a mixture thereof with carbon dioxide in a continuous operation by reduction of the oxygen to water by means of hydrogen in the presence of a special contact agent.

(b) The next step in the preparation of the gas sample is the removal of water formed from oxygen consumed during combustion, the quantity of which is unusually large in respect to the amounts occurring in analytical operations. Now we have found that it is possible to condense the formed water at a temperature slightly below its boiling point. The condensation does not interfere with the quantitative transfer of carbon dioxide into the detector unit when one uses an adequate carrier gas as gas transporting agent, i.e., practically no carbon dioxide retention due to the removal of water takes place, and thus no memory effect is caused in the course of the measurement. On utilizing this finding, it becomes possible to rinse the formed carbon dioxide gas directly into the detector unit, without any previous isolation, i.e., freezing by means of liquefied air.

(c) Lastly, the invention is based on the discovery that on using an adequate gas or gas mixture as counting gas, the sample of carbon dioxide gas is suitable for measurement without any particular purification process.

The present invention concerns the measurement in the gas phase of the radioactivity of substances labelled with $^{14}C$ isotope, preferably of organic compounds and of substances of biological origin, by means of converting the samples by combustion into a gas, preferably carbon dioxide, containing $^{14}C$ isotope, followed by the transfer of this gas sample into a detector unit, and by the determination of its radioactivity. The process according to the invention is carried out by converting the excess of oxygen applied for the combustion, in a continuous operation, by hydrogen into water vapour, in a reactor packed with a metal-metal oxide base contact catalyst of buffer effect, preferably with a mixture of Cu and CuO, removing the water by condensation from the formed gas mixture, and transferring in the meantime the carbon dioxide into the detector unit by means of a counting gas, preferably a hydrocarbon gas or a mixture of such gases.

The contact substance of metal-metal oxide base may consist preferably, as stated above, of a mixture of copper and copper oxide, further of a mixture of iron, nickel, cobalt, manganese, chromium and/or vanadium with the corresponding oxides.

The oxygen and hydrogen gas, respectively, required in a nearly stoichiometric ratio for the preparation of gas samples, can be preferably produced *in situ*, in an electrolysis cell. Owing to the high current intensity needed for this step, also significant amounts of ozone are formed which promote the quantitative and rapid combustion of the substances. By varying the potential applied on the cells, the gas flow rate can be regulated very accurately.

Preferably a contact catalyst mixture of Cu and CuO is applied for the continuous realization of the reaction $2H_2+O_2=2H_2O$. The reaction takes place on the surface of this catalyst at a sufficiently high rate, and the cuprous oxide present in the mixture takes care of the replacement of oxygen consumed in the combustion of carbon and hydrogen, respectively, contained in the sample tested. Moreover, the catalyst mixture of Cu and CuO possesses also a sufficient buffer capacity which compensates the local inequalities in the concentration of oxygen and hydrogen of the gas current, according to the reaction equations:

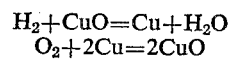

$$H_2+CuO=Cu+H_2O$$
$$O_2+2Cu=2CuO$$

In accordance with preferred mode of realization of the process according to the invention, the sequence and continuity can be maintained without any manual intervention of the operators for preparing the gas samples by a feeding device and by gas valves operated electromechanically or pneumatically, controlled by a time programmer adjustable as desired.

Further the invention concerns an apparatus for the realization of the discussed method of measurement. According to the invention, the apparatus consists of a feeding device joining with a chamber for the conversion of the carbon content of the test sample into gas, of a reactor joined with said chamber and serving for the removal of oxygen from the gas, and packed with a contact catalyst of a condensing vessel joined with said reactor, of a detector unit joined with said condensing vessel, and of a recording unit joined with said detector unit.

In a preferred form of realization of this apparatus, also an electrolysis cell is joined with the conversion chamber and with the reactor said cell serving for producing oxygen and hydrogen gases.

Figure 1:
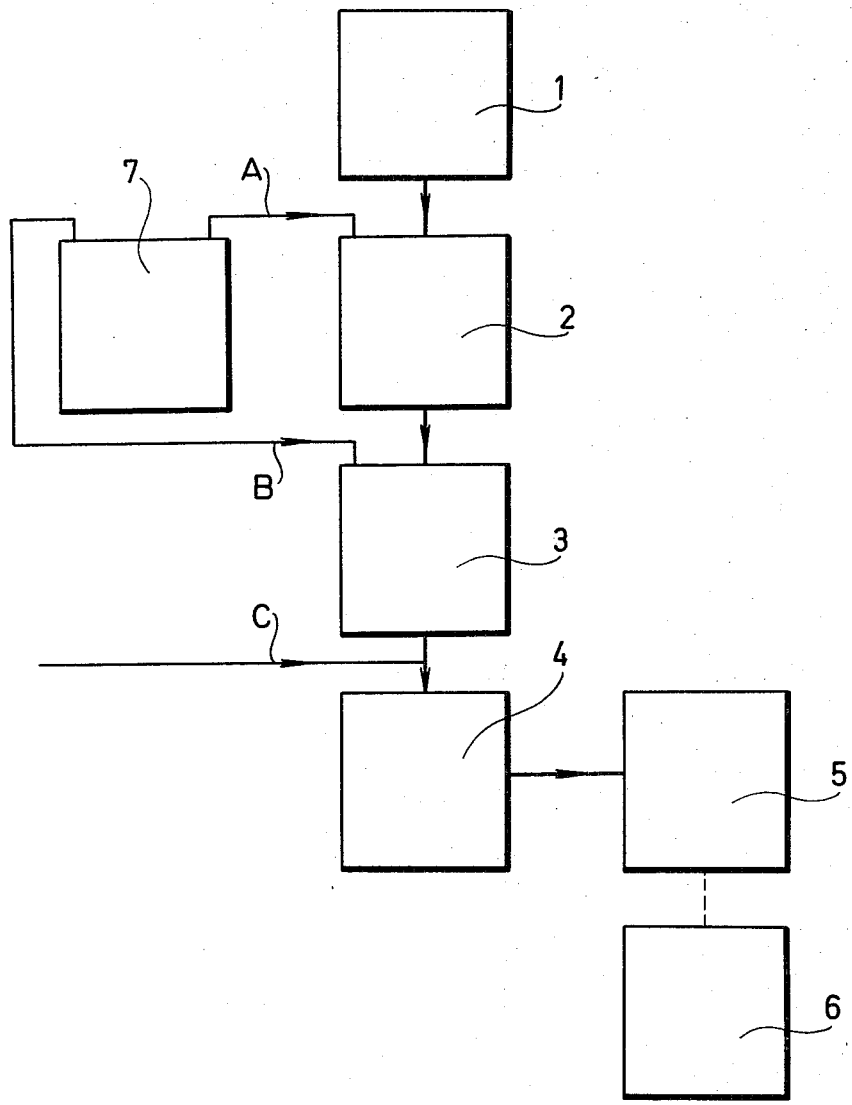
FIG. 1 shows a block diagram of the apparatus according to the invention.

The apparatus according to the invention and its operation, respectively, are described below with reference to FIG. 1.

The sample to be tested is transferred by feeding device 1 into chamber 2 where the carbon content of the sample is converted by combustion into gas, preferably into carbon dioxide. The gas is transferred by an oxygen current into reactor 3 where it is mixed with hydrogen, and the mixture of hydrogen and oxygen is converted into water vapour on the contact catalyst, preferably a mixture of Cu and CuO. The gas sample is forwarded by the water vapour into condenser vessel 4 where the water vapour condenses. The gas sample is further transported by a carrier gas, preferably a mixture of propane and butane, carrying the gas containing the full $^{14}C$-content of the initial sample into the detector unit 5, which is joined with recording device 6. Oxygen and hydrogen gases are expediently produced in the electrolysis cell 7. Gas pipes A, B and C connect the system with the sources of oxygen, hydrogen and counting gas, respectively. Connection between the individual parts of the apparatus is maintained by means of automatically operated valves. The operation of these valves in the desired sequence is governed by a programmer.

The major advantages offered by the process and apparatus according to the present invention are as follows:

(1) Measurement is carried out throughout in the same gas phase. Thus, the activity of $^{14}C$-containing substances of diverse physical properties can be determined under identical conditions.

(2) The apparatus yields very reproducible, accurate results. Accuracy and reproducibility of the obtained data are independent of the skill and training of the operator.

(3) The efficiency of counting is nearly 100%, and remains at a constant level. Thus, no calculations for corrections are required, and the apparatus does not need an expensive computer.

(4) The samples of test substances, which do not require any particular pre-treatment, pass through the operational steps of conversion into counting gas, from entering the feeding device continuously and automatically, without being touched by a human hand. Thus, the operation of the apparatus is extremely simple, and its capacity is high.

(5) Owing to its simple structure, the apparatus is inexpensive, the probability of defects in its operation is low, and its maintenance can be carried out easily.

(6) Since the measurements are performed throughout in an identical chemical form, the operation of the apparatus can be readily and accurately checked by means of standard samples.

(7) The detector unit is operated at atmospheric pressure and room temperature, and no expensive equipments for vacuum, for cooling or conditioning are needed.

Figure 2:
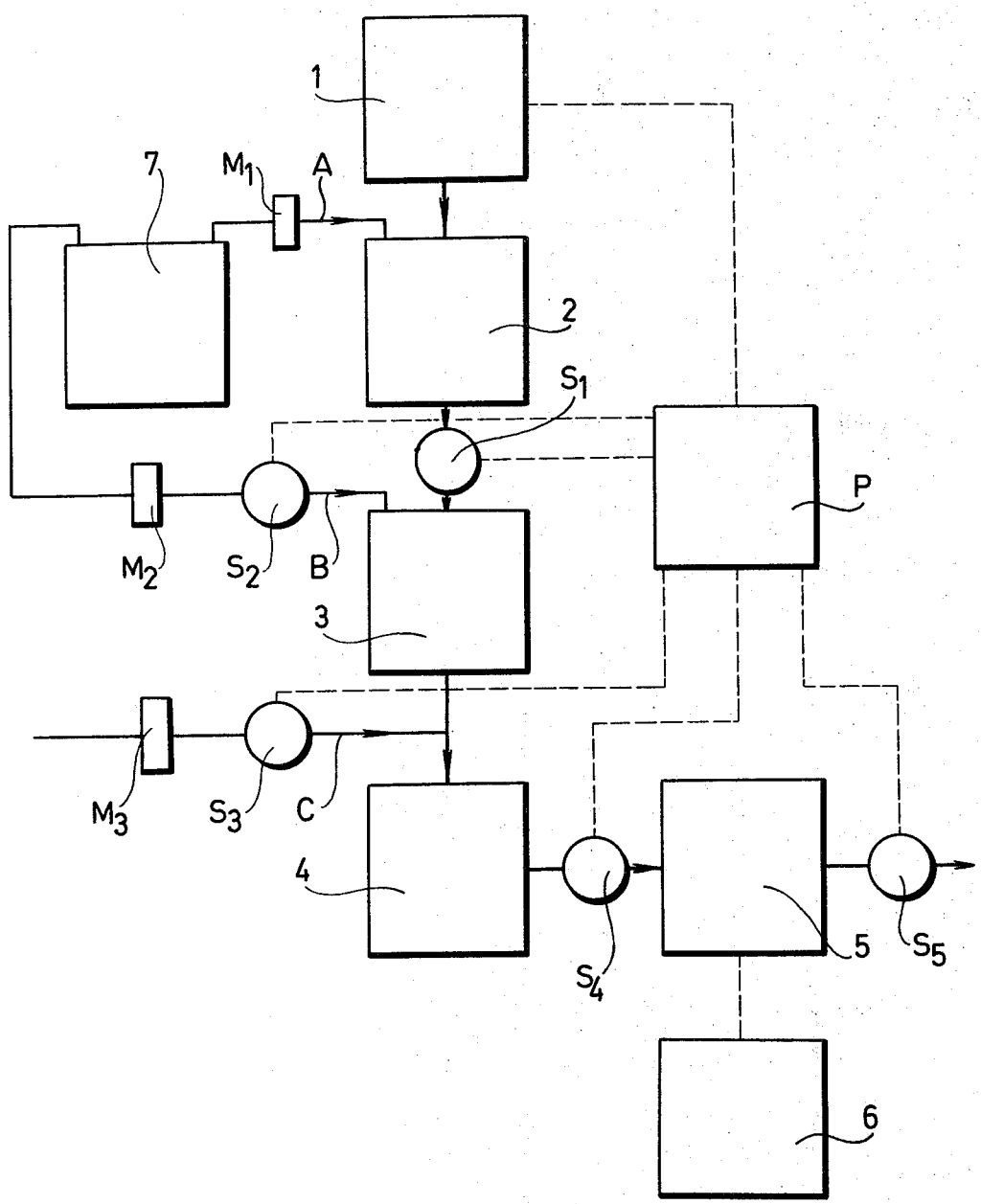
FIG. 2 is a block diagram of a preferred form of realization of the apparatus according to the invention.

A preferred form of realization of the process according to the invention and the mode of operation of a preferred form of the apparatus are described below, with reference to FIGS. 2 and 3, respectively.

The samples of radioactive substances weighed into aluminium-foil containers are placed in feeding device 1. On the governing impulse of programmer P, the first sample is dropped by the feeding device into the combustion chamber of silica, heated to 900° C. and filled with oxygen gas supplied by the electrolysis cell 7 through the liquid-leveller type pressure regulator $M_1$ and pipe A. The combustion of the sample is completed in one minute. Valve $S_1$ is opened one minute after the moment of droppin, on a new impulse of programmer P, and the radioactive carbon dioxide formed on combustion is transported by the excess of oxygen gas into reactor 3. Simultaneously with the opening of valve $S_1$, also valve $S_2$ is opened and allows the hydrogen gas to pass from electrolysis cell 7 through pressure regulator $M_2$ and pipe B into reactor 3 where it is mixed with the gas mixture arriving from the combustion chamber. On the Cu-CuO packing of reactor 3 heated to 600° C., oxygen and hydrogen are converted into water vapour which transfers carbon dioxide from reactor 3. The propane-butane gas current arriving through the opened valve $S_3$, pressure regulator $M_3$ and pipe C, carries the radioactive carbon dioxide into counter valve 5 while the water vapour formed in combustion chamber 2 and reactor 3 is condensed in the water-condensing system 4.

Radioactivity is measured in a counting period of two minutes during which valves $S_4$ and $S_5$ are kept closed. The counter valve operates in proportional domain at 4700 v.; it is protected from background radiation by a circular anticoincidence shield and a 5 cm. thick lead shield. Electric signals arriving from the counter valve are recorded by the two-channel coincidence-counting device 6 whereas a third channel reduces the signals of the inner valve by the impulses arriving in the coincidence. The impulses of the individual channels are recorded by the device on a tape.

Figure 3:
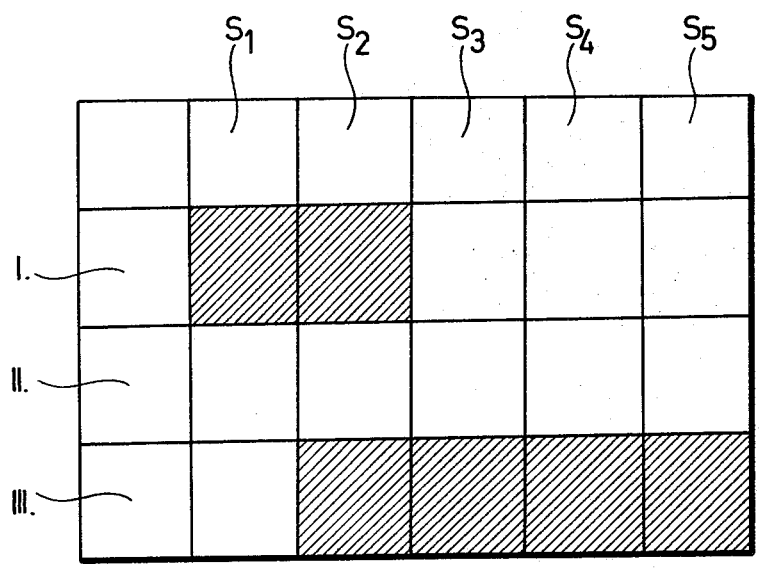
FIG. 3 is the operational program disclosing the operation of the apparatus according to the invention.

The operation is carried out in three periods according to the scheduled program shown in FIG. 3. The hatched squares represent closed valve positions and the empty squares indicate opened ones. Roman numerals denote the periods, whereas the signs $S_1$, $S_2$, $S_3$, $S_4$ and $S_5$ refer to the appropriate valves shown in FIG. 2.

Period I: combustion and decontamination

Valves $S_1$ and $S_2$ are closed. Gas mixture propane-butane is flowing through the opened valves $S_3$, $S_4$ and $S_5$, and through the counter valve. Duration: one minute.

Period II: rinsing

All valves are open. Carbon dioxide formed on combustion is rinsed from the combustion chamber by an oxygen gas current. At the same time, excess oxygen in the reactor is reduced to water vapour in a continuous operation, water vapours are condensed in the water-condenser, and the gas sample is forwarded into the counter valve by the propane-butane gas current. Duration: two minutes.

Period III: measurement and regeneration of catalyst

Oxygen flows into the reactor through the opened valve $S_1$ whereas valves $S_2$, $S_3$, $S_4$ and $S_5$ are closed. Duration: two minutes.

The above-specified three periods are repeated without any manual intervention until all the samples placed in the feeding device 1 are dropped consecutively into the combustion chamber.

The results of the series of measurements which confirm the fair reproducibility of the process data and the reliable operation of the apparatus are given in Table I below. File numbers 1 to 5 and 6 to 10 refer to results of parallel measurements of standard substances whereas the other data concern those of samples withdrawn from various organs.

TABLE I

| File number | Nature of sample | Net weight, mg. | Activity background C.p.m. | Activity background C.p.m. | Activity minus background, c.p.m./mg. |
|---|---|---|---|---|---|
| 1 | Benzoic acid | 16.2 | 88,047 | 83 | 5,352 |
| 2 | do | 11.4 | 61,492 | 83 | 5,311 |
| 3 | do | 7.3 | 39,639 | 83 | 5,347 |
| 4 | do | 2.1 | 11,479 | 83 | 5,383 |
| 5 | do | 3.8 | 20,725 | 83 | 5,371 |
| 6 | Acetanilide | 4.7 | 59,145 | 101 | 12,483 |
| 7 | do | 12.3 | 154,882 | 101 | 12,491 |
| 8 | do | 11.0 | 139,370 | 101 | 12,569 |
| 9 | do | 6.2 | 77,798 | 101 | 12,447 |
| 10 | do | 6.8 | 85,694 | 101 | 12,501 |
| 11 | Blood | 20.2 | 16,907 | 88 | 749 |
| 12 | do | 14.5 | 11,440 | 88 | 701 |
| 13 | Liver | 27.4 | 57,156 | 84 | 2,002 |
| 14 | do | 31.0 | 70,122 | 84 | 2,178 |
| 15 | Kidney | 24.0 | 10,448 | 90 | 347 |
| 16 | do | 17.6 | 6,829 | 90 | 298 |
| 17 | Brain | 28.3 | 4,273 | 90 | 61 |
| 18 | do | 22.7 | 3,155 | 90 | 49 |
| 19 | Urine | 18.6 | 14,028 | 87 | 692 |
| 20 | do | 23.3 | 19,223 | 87 | 738 |

What we claim is:

1. A process for the automatic, continual, gas phase measurement of the radioactivity of a substance labeled with $^{14}C$ isotope, comprising:
   (a) adding to said labeled substance a quantity of oxygen in excess of the amount required for complete combustion of the substance,
   (b) subjecting the mixture of (a) to combustion to produce combustion gases,
   (c) reacting the unconsumed oxygen in the combustion gases with hydrogen in the presence of a catalyst to convert the uneonsumed oxygen to water,
   (d) separating the water, thus formed, from the combustion gases,
   (e) transferring the combustion gases with a counting gas to a detector, and
   (f) determining the radioactivity of said combustion gases.

2. The process of claim 1, wherein the combustion gases of (b) comprise $CO_2$ and oxygen, and wherein the catalyst of (c) is a mixture of at least one of copper, iron, nickel, cobalt, manganese, chromium and vanadium with its corresponding oxide.

3. The process of claim 2, wherein the oxygen of (a) and the hydrogen of (c) are produced by the electrolysis of water, and wherein the voltage used in said electrolysis is also used for controlling the feeding rate of the gaseous electrolysis products into the process.

4. Apparatus for carrying out the process of claim 1, comprising a combustion zone for converting a test substance labeled with $^{14}C$ isotope in an oxygen atmosphere into a combustion gas containing $CO_2$, a feeding device for continuously intermittently feeding individualized test samples of the $^{14}C$-labeled substance into said combustion chamber, a reactor packed with a contact catalyst for converting the unconsumed oxygen content of the combustion gases to water, a condenser for removing the water by condensation from the combustion gases, a detector and recording unit associated therewith for determining the radioactivity of the dewatered combustion gas.

5. The apparatus of claim 4, further comprising an electrolysis unit for the production of hydrogen and oxygen and a time programmer for continuously controlling the operation of the apparatus.

References Cited

UNITED STATES PATENTS

| 3,226,197 | 12/1965 | Lewis | 23—230 R |
| 3,506,402 | 4/1970 | Simon | 250—83.6 FT |
| 3,676,679 | 7/1972 | Waters | 250—83.6 FT |
| 3,726,646 | 4/1973 | Kravetz | 23—230 B |

OTHER REFERENCES

M. Hamada et al., Anal. Chem. 38, 943–5 (1966).

U.S. Cl. X.R.

23—230B, 232 R, 253 PC, 254 R; 250—43.5 MR, 44

MORRIS O. WOLK, Primary Examiner

S. MARANTZ, Assistant Examiner